(12) United States Patent
Zhou et al.

(10) Patent No.: US 8,568,615 B2
(45) Date of Patent: *Oct. 29, 2013

(54) FULL-COLOR LIGHT-EMITTING MATERIAL AND PREPARATION METHOD THEREOF

(75) Inventors: Mingjie Zhou, Shenzhen (CN); Wenbo Ma, Shenzhen (CN); Zhaopu Shi, Shenzhen (CN)

(73) Assignee: Oceans King Lighting Science & Technology Co., Ltd., Shenzhen (CN)

( * ) Notice: Subject to any disclaimer, the term of this patent is extended or adjusted under 35 U.S.C. 154(b) by 136 days.

This patent is subject to a terminal disclaimer.

(21) Appl. No.: 13/319,336

(22) PCT Filed: May 11, 2009

(86) PCT No.: PCT/CN2009/071719
§ 371 (c)(1),
(2), (4) Date: Nov. 8, 2011

(87) PCT Pub. No.: WO2010/130075
PCT Pub. Date: Nov. 18, 2010

(65) Prior Publication Data
US 2012/0056130 A1 Mar. 8, 2012

(51) Int. Cl.
*C09K 11/08* (2006.01)
*C09K 11/66* (2006.01)

(52) U.S. Cl.
USPC .................................................. 252/301.4 F

(58) Field of Classification Search
USPC ...................................... 252/301.4 F, 301.4 R
See application file for complete search history.

(56) References Cited

U.S. PATENT DOCUMENTS

| | | | |
|---|---|---|---|
| 2003/0094889 A1* | 5/2003 | Imamura et al. | 313/486 |
| 2005/0274972 A1* | 12/2005 | Roth et al. | 257/100 |
| 2006/0124901 A1* | 6/2006 | Xu et al. | 252/301.4 R |
| 2009/0072255 A1* | 3/2009 | Takahashi et al. | 257/98 |
| 2012/0012786 A1* | 1/2012 | Zhou et al. | 252/301.4 F |

OTHER PUBLICATIONS

International Search Report of PCT Application No. PCT/CN2009/071719.

* cited by examiner

*Primary Examiner* — Emily Le
*Assistant Examiner* — Lynne Edmondson

(57) ABSTRACT

A full-color light-emitting material and preparation method thereof are provided. A light-emitting material is following general formula compound $(Y_{1-x-y-z}A_xB_yC_z)_2GeO_5$, wherein $0<x\leq0.05, 0<y\leq0.15, 0<z\leq0.15, x:y:z=1:1\sim10:1\sim10$, A is one of Tm and Ce, B is one of Tb, Ho, Er and Dy, C is one of Eu, Pr and Sm. Preparation method is: grinding the raw material uniformly, then sintering the material at 1300~1500 °C. for 6~24 h, cooling down the material to room temperature then getting the product. A full-color light-emitting material which can emit red-green-blue full-color light directly and be adapted for light-emitting device excited in ultraviolet zone without other doped material is provided. And a preparation method having simple process, stable product quality for full-color light-emitting materials is provided.

20 Claims, 2 Drawing Sheets

FULL-COLOR LIGHT-EMITTING MATERIAL AND PREPARATION METHOD THEREOF

FIELD OF THE INVENTION

The present invention belongs to technical fields of photoelectronic display and lighting, and relates to a fluorescent material, more particularly, to a full-color light-emitting material capable of emitting red-blue-green (R-G-B) full-color light directly and preparation method thereof.

BACKGROUND OF THE INVENTION

With the development of semiconductor lighting technology (LED), such revolutionary new light source has come into our daily life gradually. When the third generation semiconductor material gallium nitride is used as the semiconductor lighting source, its power consumption is only one-tenth of that of a common incandescent lamp under the same brightness; its lifetime can reach more than 1 million hours as well. As a new-type lighting technology, LED can be applied into varieties of fields such as indication, display, decoration, backlight and general lighting due to its numerous advantages including energy conservation, green environmental protection and flexible application etc., which is to bring about a revolution in the lighting field. Therefore, there is an urgent need for an efficient fluorescent material, which is capable of converting the blue-purple light emitted by light-emitting components including LED into the visible light, thus achieving white-light and multi-color light-emitting devices.

In the prior art, a main approach for achieving the white light emission of LED is through the cooperation of a blue-light LED chip and a rare earth garnet yellow fluorescent powder (such as YAG:$Ce^{3+}$ or TAG:$Ce^{3+}$) which is excited by cerium. However, the white light spectrum implemented by such method is short of green and red element, thus leading to two obvious disadvantages namely low color rendering property and high color temperature. In order to solve the disadvantages mentioned above, on one hand, green fluorescent powder or red fluorescent powder is doped into the yellow fluorescent powder excited by blue-light LED chip. On the other hand, an ultraviolent LED chip is used for exciting the red-green-blue tribasic fluorescent powder to enhance the color rendering property and regulate the color temperature. Although the above-mentioned two approaches can solve the problems of color rendering property and color temperature of light source relatively well, it still is required to encapsulate the LED chip after mixing various fluorescent powders with resin. During this process, the problem lies in that different kinds of fluorescent powders may not be mixed uniformly, which causing the non-uniform color of produced white light and influencing its practicability seriously.

SUMMARY OF THE INVENTION

The objective of the present invention is to provide a full-color light-emitting material which is able to emit a red-green-blue (R-G-B) full-color light directly without the need of doping any other substances, has good luminescent property and adapts for being excited by light-emitting components in ultraviolet zone (240~410 nm), aiming at the drawbacks that green fluorescent powder or red fluorescent powder should be added in the approach for achieving the white light emission of LED of prior art through the cooperation of a blue-light LED chip and a rare earth garnet yellow fluorescent powder which is excited by cerium, causing the non-uniform color of produced white light and influencing its practicability seriously when various fluorescent powders are not mixed uniformly.

Another objective of the present invention is to provide a preparation method for full-color light-emitting material which has simple process and stable product quality.

According to an aspect, a full-color light-emitting material is provided, which is a compound of following general formula $(Y_{1-x-y-z}A_xB_yC_z)_2GeO_5$, wherein x is $0<x\leq0.05$, y is $0<y\leq0.15$, z is $0<z\leq0.15$ and x:y:z=1:1~10:1~10; A is one selected from a group of Tm and Ce, B is one selected from a group of Tb, Ho, Er and Dy, and C is one selected from a group of Eu, Pr and Sm.

Ranges of x, y and z are preferably $0<x\leq0.03$, $0<y\leq0.10$ and $0<z\leq0.10$, respectively.

The ratio of x:y:z is preferably 1:1~6:1~6.

According to an aspect, a preparation method for full-color light-emitting material is provided, which comprising taking an oxide, carbonate, oxalate, acetate, nitrate or halide of Y and Ge together with an oxide, carbonate, oxalate, acetate, nitrate or halide of A, B and C as raw materials, grinding the raw materials uniformly, sintering the raw materials at 1300~1500° C. for 6~24 h, cooling down the raw materials to room temperature and then obtaining the full-color light-emitting material; wherein A is one selected from a group of Tm and Ce, B is one selected from a group of Tb, Ho, Er and Dy, and C is one selected from a group of Eu, Pr and Sm.

In the preparation method for full-color light-emitting material, the method preferably comprises grinding the raw materials uniformly in a mortar, sintering the raw materials at 1350~1450° C. for 8~15 h, cooling down the raw materials to room temperature and then obtaining the full-color light-emitting material.

In the preparation method for full-color light-emitting material, the method comprises weighting the raw materials in a stoichiometric ratio of each element in a chemical formula $(Y_{1-x-y-z}A_xB_yC_z)_2GeO_5$, that is, weighing the raw materials in accordance with a molar ratio of each element in the chemical formula; wherein ranges of x, y and z are respectively $0<x\leq0.05$, $0<y\leq0.15$ and $0<z\leq0.15$, and ratio of x:y:z is 1:1~10:1~10.

In the preparation method for full-color light-emitting material, the range of x, y and z is preferably $0<x\leq0.03$, $0<y\leq0.10$ and $0<z\leq0.10$, respectively.

In the preparation method for full-color light-emitting material, the ratio of x:y:z is preferably 1:1~6:1~6.

In the raw material, Purity of the oxide, carbonate, oxalate, acetate, nitrate or halide is no less than analytic purity.

The light-emitting material prepared in the present invention uses germanate doped with rare earth. Accordingly, the light-emitting material is capable of emitting a full-color light when excited in the ultraviolet zone (240~410 nm) and has good luminescent property due to the addition of rare earth. Besides, an ideal white lighting can be achieved by adapting the ratio of the doping rare earth in the germanate.

The preparation method for full-color light-emitting material of the present invention has simple process, stable product stability, strong practicability and wide range of application.

BRIEF DESCRIPTION OF THE DRAWINGS

The present invention will be further described with reference to the accompanying drawings and embodiments in the following. In the Figures.

wherein the excitation wavelength of the emission spectrum is 360 nm.

DETAILED DESCRIPTION OF THE PREFERRED EMBODIMENT

The full-color light-emitting material of the present invention is the compound of following general formula: $(Y_{1-x-y-z}A_xB_yC_z)_2GeO_5$, wherein the ranges of x, y and z are respectively 0<x≤0.05, 0<y≤0.15 and 0<z≤0.15, and the ratio of x:y:z is 1:1~10:1~10. Among them, A is one selected from the group of Tm and Ce, B is one selected from the group of Tb, Ho, Er and Dy, and C is one selected from the group of Eu, Pr and Sm. The ranges of x, y and z are preferably 0<x≤0.03, 0<y≤0.10 and 0<z≤0.10, respectively. The ratio of x:y:z is preferably 1:1~6:1~6.

A preparation method for full-color light-emitting material is provided, which comprises taking the oxide, carbonate, oxalate, acetate, nitrate or halide of Y and Ge together with the oxide, carbonate, oxalate, acetate, nitrate or halide of A, B and C as the raw materials, grinding the raw materials uniformly, sintering the raw materials at 1300~1500° C. for 6~24 h, cooling down the raw materials to room temperature and then obtaining the full-color light-emitting material; wherein A is one selected from the group of Tm and Ce, B is one selected from the group of Tb, Ho, Er and Dy, and C is one selected from the group of Eu, Pr and Sm.

In the preparation method for full-color light-emitting material, the method preferably comprises grinding the raw material uniformly in a mortar, sintering the uniform raw materials at 1350~1450° C. for 8~15 h, cooling down the raw materials to room temperature and then obtaining the full-color light-emitting material.

In the preparation method for full-color light-emitting material, the method comprises weighting the raw materials in the stoichiometric ratio of each element in the chemical formula $(Y_{1-x-y-z}A_xB_yC_z)_2GeO_5$, that is, weighing the raw material in accordance with the molar ratio of each element in the formula; wherein the ranges of x, y and z are respectively 0<x≤0.05, 0<y≤0.15 and 0<z≤0.15, and the ratio of x:y:z is 1:1~10:1~10. Preferably, the ranges of x, y and z are respectively 0<x≤0.03, 0<y≤0.10 and 0<z≤0.10, and the ratio of x:y:z is 1:1~6:1~6.

In the raw material, the purity of the oxide, carbonate, oxalate, acetate, nitrate or halide is preferably no less than analytic purity.

The present invention will be further explained in detail according to some examples in the following.

Example 1

Figure 1:
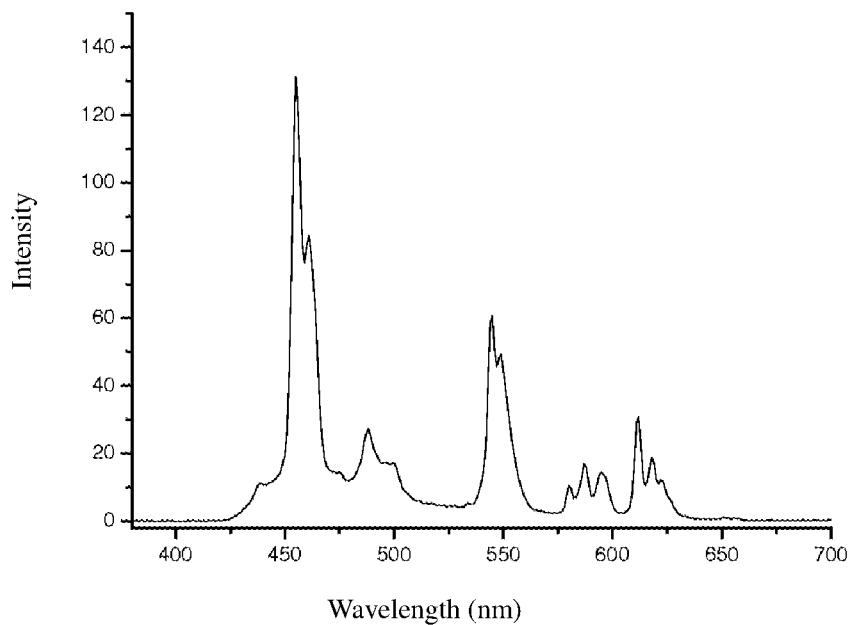
FIG. 1 is the emission spectrum of the full-color light-emitting material $(Y_{0.97}Tm_{0.01}Tb_{0.01}Eu_{0.01})_2GeO_5$ prepared in the example 1.

$(Y_{0.97}Tm_{0.01}Tb_{0.01}Eu_{0.01})_2GeO_5$ Prepared by High Temperature Solid-State Method At room temperature, 0.97 mmol $Y_2O_3$, 0.01 mmol $Tm_2O_3$, 0.005 mmol $Tb_4O_7$, 0.01 mmol $Eu_2O_3$ and 1 mmol $GeO_2$ are placed in an agate mortar and grinded to be uniform. Then the obtained powder is transferred to a corundum crucible and then placed in a high temperature box-type furnace, in which the powder is sintered at 1350° C. for 15 h. Subsequently, the yielded product is cooled down to room temperature and further grinded in a mortar. Then a full-color light-emitting material $(Y_{0.97}Tm_{0.01}Tb_{0.01}Eu_{0.01})_2GeO_5$ is obtained. As shown in FIG. 1, it is the emission spectrum of the full-color light-emitting material $(Y_{0.97}Tm_{0.01}Tb_{0.01}Eu_{0.01})_2GeO_5$ prepared in the example. As shown in the FIG. 1, when excited at 360 nm, the full-color light-emitting material prepared in the example emits a blue light at 455, 460 and 487 nm, a yellow-green light at 544, 548, 580 and 587 nm, as well as an orange red light at 594, 611, 618 and 622 nm, thus realizing the full-color composite luminescence. The preparation method above has simple steps and stable product quality.

Example 2

$(Y_{0.97}Tm_{0.01}Tb_{0.01}Eu_{0.01})_2GeO_5$ Prepared by High Temperature Solid-State Method At room temperature, 1.94 mmol $Y(NO_3)_3$, 0.02 mmol $Tm(NO_3)_3$, 0.02 mmol $Tb(NO_3)_3$, 0.02 mmol $Eu(NO_3)_3$ and 1 mmol $GeO_2$ are placed in an agate mortar and grinded to be uniform. Then the obtained powder is transferred to a corundum crucible and placed in a high temperature box-type furnace, in which the powder is sintered at 1300° C. for 24 h. Subsequently, the yielded product is cooled down to room temperature and further grinded in a mortar. Then a full-color light-emitting material $(Y_{0.97}Tm_{0.01}Tb_{0.01}Eu_{0.01})_2GeO_5$ is obtained.

Example 3

$(Y_{0.945}Tm_{0.01}Dy_{0.02}Eu_{0.025})_2GeO_5$ Prepared by High Temperature Solid-State Method At room temperature, 0.945 mmol $Y_2O_3$, 0.01 mmol $Tm_2O_3$, 0.02 mmol $Dy_2O_3$, 0.025 mmol $Eu_2O_3$ and 1 mmol $GeO_2$ are placed in an agate mortar and grinded to be uniform. Then the e obtained powder is transferred to a corundum crucible and placed in a high temperature box-type furnace, in which the powder is sintered at 1450° C. for 8 h. Subsequently, the yielded product is cooled down to room temperature and further grinded in a mortar. Then a full-color light-emitting material $(Y_{0.945}Tm_{0.01}Dy_{0.02}Eu_{0.025})_2GeO_5$ is obtained.

Example 4

$(Y_{0.945}Tm_{0.01}Ho_{0.015}Eu_{0.03})_2GeO_5$ Prepared by High Temperature Solid-State Method At room temperature, 0.945 mmol $Y_2O_3$, 0.01 mmol $Tm_2O_3$, 0.015 mmol $Ho_2O_3$, 0.03 mmol $Eu_2O_3$ and 1 mmol $GeO_2$ are placed in an agate mortar and grinded to be uniform. Then the obtained powder is transferred to a corundum crucible and placed in a high temperature box-type furnace, in which the powder is sintered at 1500° C.; for 6 h. Subsequently, the yielded product is cooled down to room temperature and further grinded in a mortar. Then a full-color light-emitting material $(Y_{0.945}Tm_{0.01}Ho_{0.015}Eu_{0.03})_2GeO_5$ is obtained.

Example 5

$(Y_{0.94}Tm_{0.01}Er_{0.025}Eu_{0.025})_2GeO_5$ Prepared by High Temperature Solid-State Method At room temperature, 0.94 mmol $Y_2O_3$, 0.01 mmol $Tm_2O_3$, 0.025 mmol $Er_2O_3$, 0.025 mmol $Eu_2O_3$ and 1 mmol GeO$_2$ are placed in an agate mortar and grinded to be uniform. Then the obtained powder is transferred to a corundum crucible and placed in a high temperature box-type furnace, in which the powder is sintered at 1400° C. for 11 h. Subsequently, the yielded product is cooled down to room temperature and further grinded in a mortar. Then a full-color light-emitting material (Y$_{0.94}$Tm$_{0.01}$Er$_{0.025}$Eu$_{0.025}$)$_2$GeO$_5$ is obtained.

Example 6

(Y$_{0.95}$Tm$_{0.01}$Tb$_{0.02}$Sm$_{0.02}$)$_2$GeO$_5$ Prepared by High Temperature Solid-State Method At room temperature, 0.95 mmol Y$_2$O$_3$, 0.01 mmol Tm$_2$O$_3$, 0.01 mmol Tb$_4$O$_7$, 0.02 mmol Sm$_2$O$_3$ and 1 mmol GeO$_2$ are placed in an agate mortar and grinded to be uniform. The remaining steps are the same as those in example 1. Then a full-color light-emitting material (Y$_{0.95}$Tm$_{0.01}$Tb$_{0.02}$Sm$_{0.02}$)$_2$GeO$_5$ is obtained.

Example 7

(Y$_{0.915}$Tm$_{0.015}$Tb$_{0.04}$Pr$_{0.03}$)$_2$GeO$_5$ Prepared by High Temperature Solid-State Method At room temperature, 0.915 mmol Y$_2$O$_3$, 0.015 mmol Tm$_2$O$_3$, 0.02 mmol Tb$_4$O$_7$, 0.01 mmol Pr$_6$O$_{11}$ and 1 mmol GeO$_2$ are placed in an agate mortar and grinded to be uniform. The remaining steps are the same as those in example 1. Then a full-color light-emitting material (Y$_{0.915}$Tm$_{0.015}$Tb$_{0.04}$Pr$_{0.03}$)$_2$GeO$_5$ is obtained.

Example 8

(Y$_{0.93}$Ce$_{0.01}$Tb$_{0.03}$Eu$_{0.03}$)$_2$GeO$_5$ Prepared by High Temperature Solid-State Method At room temperature, 0.93 mmol Y$_2$O$_3$, 0.02 mmol CeO$_2$, 0.015 mmol Tb$_4$O$_7$, 0.03 mmol Eu$_2$O$_3$ and 1 mmol GeO$_2$ are placed in an agate mortar and grinded to be uniform. The remaining steps are the same as those in example 1. Then a full-color light-emitting material (Y$_{0.93}$Ce$_{0.01}$Tb$_{0.03}$Eu$_{0.03}$)$_2$GeO$_5$ is obtained.

Example 9

Figure 2:
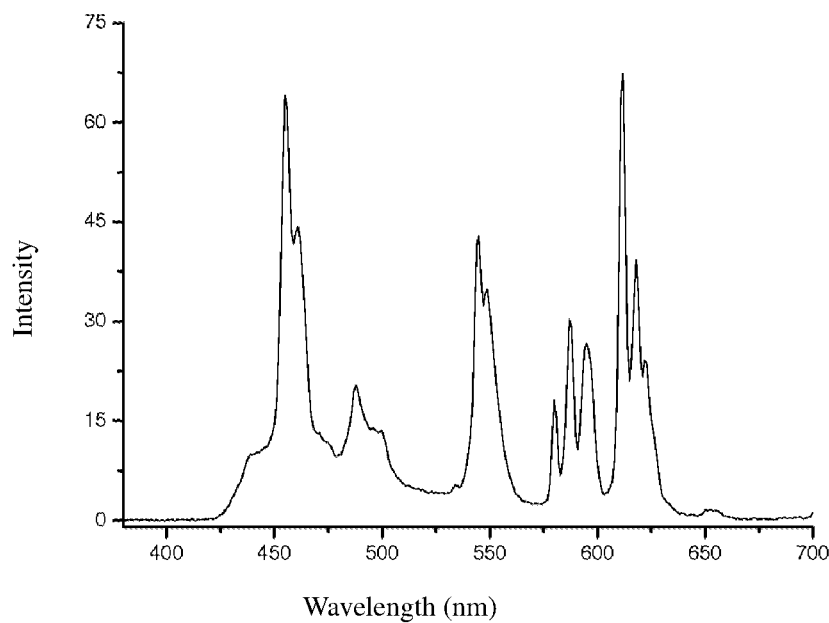
FIG. 2 is the emission spectrum of the full-color light-emitting material $(Y_{0.945}Tm_{0.01}Tb_{0.02}Eu_{0.025})_2GeO_5$ prepared in the example 9.

(Y$_{0.945}$Tm$_{0.01}$Tb$_{0.02}$Eu$_{0.025}$)$_2$GeO$_5$ Prepared by High Temperature Solid-State Method At room temperature, 0.945 mmol Y$_2$O$_3$, 0.01 mmol Tm$_2$O$_3$, 0.01 mmol Tb$_4$O$_7$, 0.025 mmol Eu$_2$O$_3$ and 1 mmol GeO$_2$ are placed in an agate mortar and grinded to be uniform. The remaining steps are the same as those in example 1. Then a full-color light-emitting material (Y$_{0.945}$Tm$_{0.01}$Tb$_{0.02}$Eu$_{0.025}$)$_2$GeO$_5$ is obtained. As shown in FIG. 2, it is the emission spectrum of the full-color light-emitting material (Y$_{0.945}$Tm$_{0.01}$Tb$_{0.02}$Eu$_{0.025}$)$_2$GeO$_5$ prepared in the example. As shown in FIG. 2, when excited at 360 nm, the full-color light-emitting material prepared in the example emits a blue light at 455, 460 and 487 nm, a yellow-green light at 544, 548, 580 and 587 nm, as well as an orange red light at 594, 611, 618 and 622 nm. The color coordinate of the combined light in the example is (03364, 0.3282), which is close to that of an ideal white light, i.e. (0.33, 0.33). Thus, a white light emission is achieved.

Example 10

(Y$_{0.92}$Tm$_{0.01}$Tb$_{0.04}$Eu$_{0.03}$)$_2$GeO$_5$ Prepared by High Temperature Solid-State Method At room temperature, 0.92 mmol Y$_2$O$_3$, 0.01 mmol Tm$_2$O$_3$, 0.02 mmol Tb$_4$O$_7$, 0.03 mmol Eu$_2$O$_3$ and 1 mmol GeO$_2$ are placed in an agate mortar and grinded to be uniform. The remaining steps are the same as those in example 1. Then a full-color light-emitting material (Y$_{0.92}$Tm$_{0.01}$Tb$_{0.04}$Eu$_{0.03}$)$_2$GeO$_5$ is obtained.

Example 11

Figure 3:
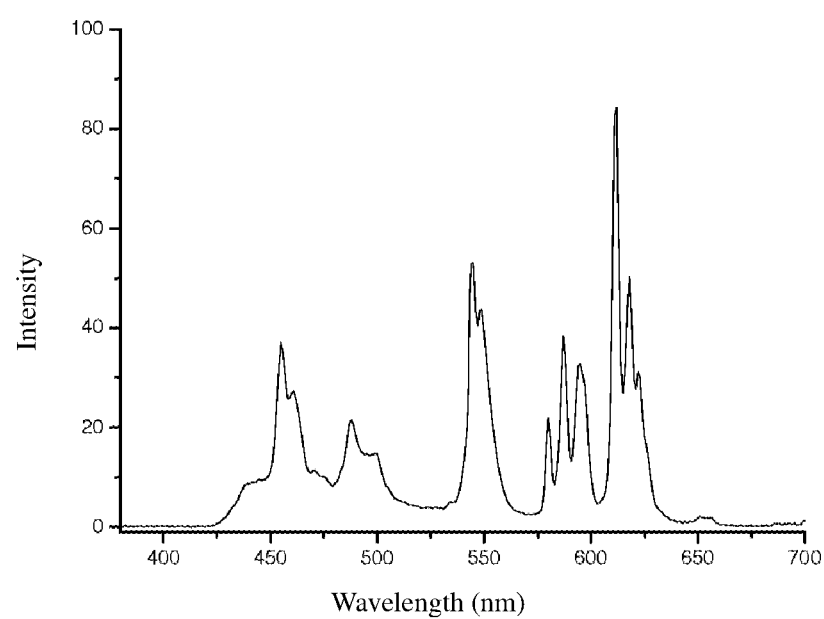
FIG. 3 is the emission spectrum of the full-color light-emitting material $(Y_{0.915}Tm_{0.01}Tb_{0.04}Eu_{0.035})_2GeO_5$ prepared in the example 11.

(Y$_{0.915}$Tm$_{0.01}$Tb$_{0.04}$Eu$_{0.035}$)$_2$GeO$_5$ Prepared by High Temperature Solid-State Method At room temperature, 0.915 mmol Y$_2$O$_3$, 0.01 mmol Tm$_2$O$_3$, 0.02 mmol Tb$_4$O$_7$, 0.035 mmol Eu$_2$O$_3$ and 1 mmol GeO$_2$ are placed in an agate mortar and grinded to be uniform. The remaining steps are the same as those in example 1. Then a full-color light-emitting material (Y$_{0.915}$Tm$_{0.01}$Tb$_{0.04}$Eu$_{0.35}$)$_2$GeO$_5$ is obtained. As shown in FIG. 3, it is the emission spectrum of the full-color light-emitting material (Y$_{0.915}$Tm$_{0.01}$Tb$_{0.04}$Eu$_{0.35}$)$_2$GeO$_5$ prepared in the example 11. As shown in FIG. 3 when excited at 360 nm, the full-color light-emitting material prepared in the example emits a blue light at 455, 460 and 487 nm, a yellow-green light at 544, 548, 580 and 587 nm, as well as an orange red light at 594, 611, 618 and 622 nm. The color coordinate of the combined light in the example is (0.3387, 0.3355), which is close to that of an ideal white light, i.e. (0.33, 0.33). Thus, a full-color composite luminescence is achieved.

Example 12

(Y$_{0.88}$Tm$_{0.01}$Tb$_{0.05}$Eu$_{0.06}$)$_2$GeO$_5$ Prepared by High Temperature Solid-State Method At room temperature, 0.88 mmol Y$_2$O$_3$, 0.01 mmol Tm$_2$O$_3$, 0.025 mmol Tb$_4$O$_7$, 0.06 mmol Et$_2$O$_3$ and 1 mmol GeO$_2$ are placed in an agate mortar and grinded to be uniform. The remaining steps are the same as those in example 1. Then a full-color light-emitting material (Y$_{0.88}$Tm$_{0.01}$Tb$_{0.06}$Eu$_{0.06}$)$_2$GeO$_5$ is obtained.

Example 13

(Y$_{0.79}$Ce$_{0.01}$Tb$_{0.1}$Eu$_{0.1}$)$_2$GeO$_5$ Prepared by High Temperature Solid-State Method At room temperature, 1.58 mmol Y(CH$_3$COO)$_3$, 0.02 mmol Ce(CH$_3$COO)$_3$, 0.2 mmol Tb(CH$_3$COO)$_3$, 0.2 mmol Eu(CH$_3$COO)$_3$ and 1 mmol Ge(NO$_3$)$_4$ are placed in an agate mortar and grinded to be uniform. The remaining steps are the same as those in example 1. Then a full-color light-emitting material (Y$_{0.79}$Ce$_{0.01}$Tb$_{0.1}$Eu$_{0.1}$)$_2$GeO$_5$ is obtained.

Example 14

(Y$_{0.815}$Tm$_{0.015}$Er$_{0.02}$Pr$_{0.15}$)$_2$GeO$_5$ Prepared by High Temperature Solid-State Method At room temperature, 0.815 mmol Y$_2$(CO$_3$)$_3$, 0.015 mmol Tm$_2$(CO$_3$)$_3$, 0.02 mmol Er$_2$(CO$_3$)$_3$, 0.3 mmol Pr(CH$_3$COO)$_3$ and 1 mmol Ge(C$_2$O$_4$)$_2$ are placed in an agate mortar and grinded to be uniform. The remaining steps are the same as those in example 1. Then a full-color light-emitting material $(Y_{0.815}Tm_{0.015}Er_{0.02}Pr_{0.15})_2GeO_5$ is obtained.

Example 15

$(Y_{0.82}Tm_{0.05}Ho_{0.01}Eu_{0.12})_2GeO_5$ Prepared by High Temperature Solid-State Method At room temperature, 0.82 mmol $Y_2(C_2O_4)_3$, 0.05 mmol $Tm_2(CO_3)_3$, 0.01 mmol $Ho_2(C_2O_4)_3$, 0.24 mmol $Eu(CH_3COO)_3$ and 1 mmol $Ge(CH_3COO)_4$ are placed in an agate mortar and grinded to be uniform. The remaining steps are the same as those in example 1. Then a full-color light-emitting material $(Y_{0.82}Tm_{0.05}Ho_{0.01}Eu_{0.12})_2GeO_5$ is obtained.

Example 16

$(Y_{0.805}Tm_{0.015}Dy_{0.15}Sm_{0.03})_2GeO_5$ Prepared by High Temperature Solid-State Method At room temperature, 1.61 mmol $YCl_3$, 0.03 mmol $TmCl_3$, 0.3 mmol $DyCl_3$, 0.06 mmol $Sm(CH_3COO)_3$ and 1 mmol $GeCl_4$ are placed in an agate mortar and grinded to be uniform. The remaining steps are the same as those in example 1. Then a full-color light-emitting material $(Y_{0.805}Tm_{0.015}Dy_{0.15}Sm_{0.03})_2GeO_5$ is obtained.

What is claimed is:

1. A full-color light-emitting material, wherein said full-color light-emitting material is a compound of following general formula $(Y_{1-x-y-z}A_xB_yC_z)_2GeO_5$, wherein x is $0<x\leq0.05$, y is $0<y\leq0.15$, z is $0<z\leq0.15$ and x:y:z=1:1~10:1~10; A is one selected from a group of Tm and Ce, B is one selected from a group of Tb, Ho, Er and Dy, and C is one selected from a group of Eu, Pr and Sm.

2. The full-color light-emitting material according to claim 1, wherein ranges of x, y and z are $0<x\leq0.03$, $0<y\leq0.10$ and $0<z\leq0.10$, respectively.

3. The full-color light-emitting material according to claim 1, wherein the ratio of x:y:z is 1:1~6:1~6.

4. A preparation method for the full-color light-emitting materials in claim 1, wherein comprising following steps: taking an oxide, carbonate, oxalate, acetate, nitrate or halide of Y and Ge together with an oxide, carbonate, oxalate, acetate, nitrate or halide of A, B and C as raw materials, grinding said raw materials uniformly, sintering said raw materials at 1300~1500° C. for 6~24 h, cooling down said material to room temperature and then obtaining the full-color light-emitting material; wherein A is one selected from a group of Tm and Ce, B is one selected from a group of Tb, Ho, Er and Dy, and C is one selected from a group of Eu, Pr and Sm.

5. The preparation method for full-color light-emitting material according to claim 4, wherein further comprising grinding said raw materials uniformly, sintering said raw materials at 1350~1450° C. for 8~15 h, cooling down said raw materials to room temperature and then obtaining the full-color light-emitting material.

6. The preparation method for full-color light-emitting material according to claim 4, wherein further comprising weighting said raw materials in a stoichiometric ratio of each element in the chemical formula $(Y_{1-x-y-z}A_xB_yC_z)_2GeO_5$; wherein ranges of x, y and z are respectively $0<x\leq0.05$, $0<y\leq0.15$ and $0<z\leq0.15$, and ratio of x:y:z is 1:1~10:1~10.

7. The preparation method for full-color light-emitting material according to claim 6, wherein said ranges of x, y and z are $0<x\leq0.03$, $0<y\leq0.10$ and $0<z\leq0.10$, respectively.

8. The preparation method for full-color light-emitting material according to claim 6, wherein said ratio of x:y:z is 1:1~6:1~6.

9. The preparation method for full-color light-emitting material according to claim 6, wherein purity of the oxide, carbonate, oxalate, acetate, nitrate or halide in said raw materials is no less than analytic purity.

10. A preparation method for the full-color light-emitting materials in claim 2, wherein comprising following steps: taking an oxide, carbonate, oxalate, acetate, nitrate or halide of Y and Ge together with an oxide, carbonate, oxalate, acetate, nitrate or halide of A, B and C as raw materials, grinding said raw materials uniformly, sintering said raw materials at 1300~1500° C. for 6~24 h, cooling down said material to room temperature and then obtaining the full-color light-emitting material; wherein A is one selected from a group of Tm and Ce, B is one selected from a group of Tb, Ho, Er and Dy, and C is one selected from a group of Eu, Pr and Sm.

11. The preparation method for full-color light-emitting material according to claim 10, wherein further comprising grinding said raw materials uniformly, sintering said raw materials at 1350~1450° C. for 8~15 h, cooling down said raw materials to room temperature and then obtaining the full-color light-emitting material.

12. The preparation method for full-color light-emitting material according to claim 10, wherein further comprising weighting said raw materials in a stoichiometric ratio of each element in the chemical formula $(Y_{1-x-y-z}A_xB_yC_z)_2GeO_5$; wherein ranges of x, y and z are respectively $0<x\leq0.05$, $0<y\leq0.15$ and $0<z\leq0.15$, and ratio of x:y:z is 1:1~10:1~10.

13. The preparation method for full-color light-emitting material according to claim 12, wherein said ranges of x, y and z are $0<x\leq0.03$, $0<y\leq0.10$ and $0<z\leq0.10$, respectively.

14. The preparation method for full-color light-emitting material according to claim 12, wherein said ratio of x:y:z is 1:1~6:1~6.

15. The preparation method for full-color light-emitting material according to claim 12, wherein purity of the oxide, carbonate, oxalate, acetate, nitrate or halide in said raw materials is no less than analytic purity.

16. A preparation method for the full-color light-emitting materials in claim 3, wherein comprising following steps: taking an oxide, carbonate, oxalate, acetate, nitrate or halide of Y and Ge together with an oxide, carbonate, oxalate, acetate, nitrate or halide of A, B and C as raw materials, grinding said raw materials uniformly, sintering said raw materials at 1300~1500° C. for 6~24 h, cooling down said material to room temperature and then obtaining the full-color light-emitting material; wherein A is one selected from a group of Tm and Ce, B is one selected from a group of Tb, Ho, Er and Dy, and C is one selected from a group of Eu, Pr and Sm.

17. The preparation method for full-color light-emitting material according to claim 16, wherein further comprising grinding said raw materials uniformly, sintering said raw materials at 1350~1450° C. for 8~15 h, cooling down said raw materials to room temperature and then obtaining the full-color light-emitting material.

18. The preparation method for full-color light-emitting material according to claim 16, wherein further comprising weighting said raw materials in a stoichiometric ratio of each element in the chemical formula $(Y_{1-x-y-z}A_xB_yC_z)_2GeO_5$; wherein ranges of x, y and z are respectively $0<x\leq0.05$, $0<y\leq0.15$ and $0<z\leq0.15$, and ratio of x:y:z is 1:1~10:1~10.

19. The preparation method for full-color light-emitting material according to claim 18, wherein said ranges of x, y and z are $0<x\le0.03$, $0<y\le0.10$ and $0<z\le0.10$, respectively.

20. The preparation method for full-color light-emitting material according to claim 18, wherein said ratio of x:y:z is 1:1~6:1~6.

* * * * *

UNITED STATES PATENT AND TRADEMARK OFFICE
CERTIFICATE OF CORRECTION

PATENT NO.         : 8,568,615 B2                                  Page 1 of 1
APPLICATION NO.    : 13/319336
DATED              : October 29, 2013
INVENTOR(S)        : Mingjie Zhou, Wenbo Ma and Zhaopu Shi It is certified that error appears in the above-identified patent and that said Letters Patent is hereby corrected as shown below:

Title Page, item (73),
    The correct name of assignee should be "Ocean's King Lighting Science & Technology Co., Ltd." instead of "Oceans King Lighting Science & Technology Co., Ltd.".

Signed and Sealed this
Eleventh Day of February, 2014

Michelle K. Lee
*Deputy Director of the United States Patent and Trademark Office*